US006595545B2

United States Patent
Curtis et al.

(10) Patent No.: US 6,595,545 B2
(45) Date of Patent: Jul. 22, 2003

(54) SEAT BELT FORCE SENSOR SYSTEM

(75) Inventors: Brian M. Curtis, Orion, MI (US); Harold Lichtinger, Auburn Hills, MI (US); Robert Graf, Pichl/Gsies (IT)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 39 days.

(21) Appl. No.: 09/853,338

(22) Filed: May 11, 2001

(65) Prior Publication Data

US 2001/0052696 A1 Dec. 20, 2001

Related U.S. Application Data

(60) Provisional application No. 60/203,778, filed on May 12, 2000, and provisional application No. 60/207,503, filed on May 26, 2000.

(51) Int. Cl.[7] .............................................. B60R 21/100
(52) U.S. Cl. .................... 280/735; 280/801.1; 180/268; 180/271
(58) Field of Search ................................ 180/271, 268; 280/808, 801.1, 735

(56) References Cited

U.S. PATENT DOCUMENTS

| | | |
|---|---|---|
| 2,513,295 A | 7/1950 | Eisenberg |
| 4,928,992 A | 5/1990 | Qvint |
| 5,413,378 A | 5/1995 | Steffens, Jr. et al. |

(List continued on next page.)

FOREIGN PATENT DOCUMENTS

| | | | |
|---|---|---|---|
| DE | 38 17 042 A1 | 12/1988 | |
| DE | 19648268 A1 | 5/1998 | |
| DE | 10049528 A1 | 10/2000 | |
| DE | 19948661 C1 | 1/2001 | |
| EP | 0 656 283 B1 | 8/1997 | |
| EP | 0997358 A2 | 5/2000 | |
| EP | 1247704 A2 * | 10/2002 | ........... B60R/22/48 |
| GB | 1275571 | 5/1972 | |
| GB | 2309483 A | 7/1997 | |
| JP | 02018135 | 1/1990 | |
| JP | 2000302004 | 10/2000 | |
| WO | WO 98/17508 | 4/1998 | |
| WO | WO 9912012 | 3/1999 | |
| WO | WO 9927337 | 6/1999 | |
| WO | WO 99/29538 | 6/1999 | |

OTHER PUBLICATIONS

Int'l Search Report, dated Apr. 17, 2002.

*Primary Examiner*—Paul N. Dickson
*Assistant Examiner*—Laura B. Rosenberg

(57) ABSTRACT

A system for measuring seat belt forces is used to control deployment of vehicle airbags. The system includes a rigid plate member having one end attached to a portion of the seat belt and an opposite end mounted to a vehicle structure. The seat belt is used to secure passengers or an infant car seat to the vehicle seat. A sensor including a strain gage is mounted on the rigid plate between the ends and is used to measure the magnitude of forces exerted on the seat belt by the passenger or car seat. The strain gage generates a signal representative of the tension in the seat belt, which is used to control deployment of the airbag. The airbag is not deployed if the tension in the seat belt exceeds a predetermined limit.

22 Claims, 5 Drawing Sheets

U.S. PATENT DOCUMENTS

| | | | |
|---|---|---|---|
| 5,431,447 A | | 7/1995 | Bauer |
| 5,454,591 A | | 10/1995 | Mazur et al. |
| 5,566,978 A | | 10/1996 | Fleming et al. |
| 5,626,359 A | | 5/1997 | Steffens, Jr. |
| 5,664,807 A | | 9/1997 | Bohmler |
| 5,855,047 A | | 1/1999 | Haas |
| 5,906,393 A | | 5/1999 | Mazur et al. |
| 5,965,827 A | * | 10/1999 | Stanley et al. .......... 73/862.391 |
| 5,996,421 A | | 12/1999 | Husby |
| 6,079,745 A | | 6/2000 | Wier |
| 6,081,759 A | * | 6/2000 | Husby et al. ............. 280/801.1 |
| 6,179,330 B1 | | 1/2001 | Wier |
| 6,205,868 B1 | * | 3/2001 | Miller ..................... 324/207.2 |
| 6,211,793 B1 | * | 4/2001 | Smithson ................... 280/806 |
| 6,230,088 B1 | * | 5/2001 | Husby ......................... 24/303 |
| 6,260,879 B1 | * | 7/2001 | Stanley ....................... 180/268 |
| 6,264,236 B1 | * | 7/2001 | Aoki ........................... 180/268 |
| 6,301,977 B1 | * | 10/2001 | Stojanovski ............ 73/862.393 |
| 6,336,371 B1 | * | 1/2002 | O'Boyle ..................... 73/865.9 |
| 6,363,793 B2 | * | 4/2002 | O'Boyle ........................ 73/828 |
| 6,400,145 B1 | * | 6/2002 | Chamings et al. ............. 24/633 |
| 6,450,534 B1 | * | 9/2002 | Blakesley et al. ........ 280/801.1 |
| 6,454,304 B1 | * | 9/2002 | Steffens, Jr. et al. ..... 280/801.1 |
| 6,481,750 B1 | * | 11/2002 | Kalina et al. ............ 280/801.1 |
| 6,502,860 B1 | * | 1/2003 | Siegfried et al. ......... 280/801.1 |
| 6,520,540 B1 | * | 2/2003 | Siegfried et al. ......... 280/801.1 |
| 2002/0145422 A1 | * | 10/2002 | Chamings et al ...... 324/207.26 |
| 2002/0148667 A1 | * | 10/2002 | Feldman ..................... 180/274 |
| 2002/0171234 A1 | * | 11/2002 | Stephen et al. ............. 280/735 |
| 2002/0189365 A1 | * | 12/2002 | Blakesley et al. ............. 73/826 |
| 2002/0189879 A1 | * | 12/2002 | Jitsui .......................... 180/268 |
| 2003/0024327 A1 | * | 2/2003 | Garver et al. .......... 73/862.393 |

* cited by examiner

SEAT BELT FORCE SENSOR SYSTEM

RELATED APPLICATION

This application claims priority to provisional application Nos. 60/203,778 filed on May 12, 2000 and No. 60/207,503 filed on May 26, 2000.

BACKGROUND OF THE INVENTION

1. Field of the Invention

This invention relates to a method and apparatus for measuring the force applied to a seat belt. Specifically, a sensor arrangement is mounted on a rigid plate secured between a seat belt portion and a vehicle structure to provide accurate seatbelt force measurements.

2. Related Art

Most vehicles include airbags and seatbelt restraint systems that work together to protect the driver and passengers from experiencing serious injuries due to high-speed collisions. It is important to control the deployment force of the airbags based on the size of the driver, or the passenger. When an adult is seated on the vehicle seat, the airbag should be deployed in a normal manner. If there is an infant seat secured to the vehicle seat then the airbag should not be deployed or should be deployed at a significantly lower deployment force. One way to control the airbag deployment is to monitor the weight of the seat occupant.

Current systems for measuring the weight of a seat occupant are complex and expensive. One type of system uses pressure sensitive foil mats mounted within the seat bottom foam. Another system uses sensors placed at a plurality of locations within the seat bottom. The combined output from the mats or the sensors is used to determine the weight of the seat occupant. If the sensors become damaged or fail to operate for some reason, the system will not provide accurate seat weight measurements and airbag deployment could occur under undesirable conditions.

Also mounting sensor systems within the seat can be difficult and time consuming. It is difficult to find mounting locations for each the sensors that will accommodate all of the various positions of a seated occupant while still providing accurate measurements. Further, shifting of the occupant on the seat can dislodge or move the sensors out of their proper location. Because the sensors are mounted within the seat bottom, it is difficult to reposition the sensors after the seat is installed in the vehicle.

Current sensor systems also can have difficulty determining whether an adult is belted to the seat or whether a child car seat is belted to the seat. When a child seat is secured to a seat with a seat belt, an excess force acts on the sensors mounted within the rear portion of the seat bottom, which interferes with accurate weight sensing. Over tightening of the seatbelt to securely hold the child seat in place, pulls the child seat down against the rear part of the seat bottom, causing the excessive force measured by the sensors. Due to this effect, the current weight sensing systems have difficulty in discerning between an adult belted to a seat and a child seat secured to the seat with a seat belt.

Thus, it is desirable to have a system for determining whether conditions are proper for deploying an airbag by determining whether a child seat or an adult is secured to the seat with a seat belt. The system should further work with traditional seat occupant weight sensing systems and should provide accurate measurements, be easy to install, and overcome the above referenced deficiencies with prior art systems.

SUMMARY OF THE INVENTION

A seat belt sensor system includes a load cell with a strain gage that is integrated into a seat belt mechanism that is used to secure an occupant to a vehicle seat. When the seat belt is tightened, the sensor is pulled into tension and this is measured by the strain gage. The strain gage measurements and signals are send to an electronics unit that processes the signals and feeds the signal back to an occupant sensing control unit. Occupant sensing control unit uses the information to determine whether a child seat or an adult is belted to the vehicle seat an ultimately controls the deployment of an airbag mechanism.

In a disclosed embodiment of this invention, the sensor assembly includes rigid member with a first end for supporting a seat belt portion and a second end for attachment to a vehicle structure, such as a B-pillar or seat mount, for example. The strain gage is mounted on the rigid member between the first and second ends and is used to measure the strain exerted on the rigid member by tension forces applied to the seat belt portion. An electrical connector is also mounted to the rigid member next to the strain gage. The electrical connector receives the strain measurements and transmits the measurements to a central processor to determine the magnitude of the tension force.

Preferably the rigid member is formed as a metallic plate that is defined by a length, width, and thickness. The length is greater than the width and the thickness is significantly less than the length and the width. The rigid member includes a neck portion positioned between the first and second ends with the width being less than the width of the first and second ends. The strain gage is mounted on the neck portion and measures the strain resulting from tension forces exerted on the first end of the rigid member by the seat belt.

In a preferred embodiment, the sensor assembly is incorporated into an occupant sensing control system that controls deployment of safety devices such as an airbag based on the tension forces measured in the seat belt. The strain gage generates a signal representative of the tension forces in the seat belt and transmits the signal to an electronic controller or processor. The airbag is prevented from deploying if the signal exceeds a predetermined limit.

A method for controlling airbag deployment includes the following steps. The seat belt assembly is provided with a buckle strap attached to a male buckle member and a seat belt latch mechanism with a female receptacle for receiving the male buckle member to secure the occupant to the vehicle seat. The rigid plate has one end secured to a portion of the seat belt and an opposite end of the plate is secured to a vehicle structure with a strain gage mounted to the rigid plate between the ends. The male buckle member is latched to the female receptacle and a tension force is generated on the seat belt assembly by tightening the buckle strap. The strain is measured on the rigid plate due to the tension force with the strain gage. A tension force signal is generated based on strain measurement and deployment of an airbag is controlled based on the tension force signal.

The airbag is not deployed if the tension in the seat belt exceeds a predetermined limit. By measuring the tension in the seat belt a differentiation can be made between an adult belted to a seat and a child seat belted to the seat. Thus, deployment of the airbag can be more effectively controlled and will not be deployed when a child seat is belted in place.

These and other features of the present invention can be best understood from the following specification and drawings, the following of which is a brief description.

DETAILED DESCRIPTION OF AN EXEMPLARY EMBODIMENT

Figure 1:
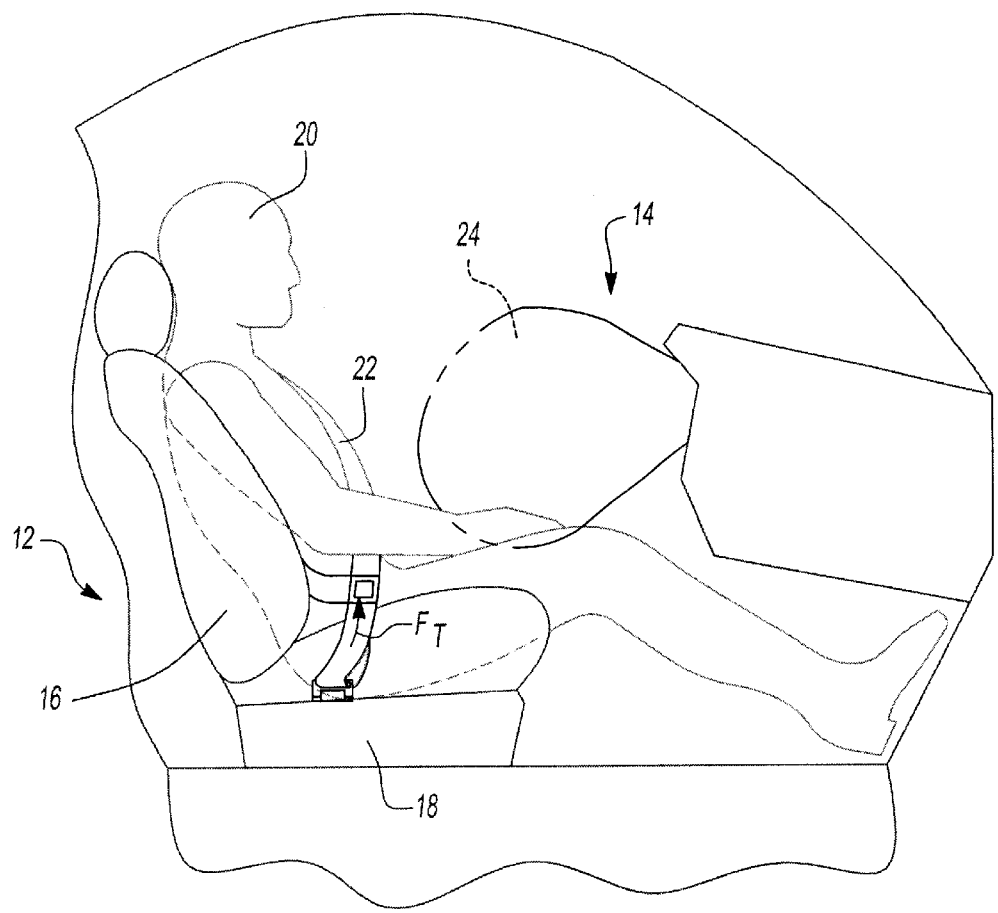
FIG. 1 is a schematic view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 is preferably a passenger seat and includes a seat back 16 and a seat bottom 18. A vehicle occupant 20 is secured to the seat 12 with a seatbelt 22. A tension force $F_T$ is exerted on the seat belt 22. The tension force $F_T$ represents the force is exerted against the occupant as the belt is tightened.

Figure 2:
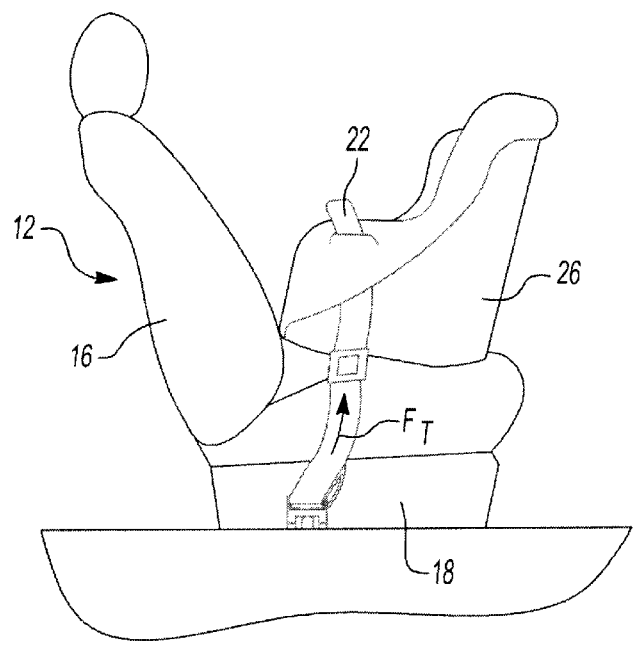
FIG. 2 is a schematic side view of a seat assembly with an infant car seat secured to the vehicle seat.

The airbag system 14 deploys an airbag 24 under certain collision conditions. The deployment force for the airbag 24, shown as deployed in dashed lines in FIG. 1, varies depending upon the type of occupant that is belted to the seat 12. When an adult 20 is belted to the vehicle seat 12, the airbag 24 should be deployed in a normal manner shown in FIG. 1. If there is an infant or child seat 26 secured to the vehicle seat 12, see FIG. 2, then the airbag 24 should not be deployed. Thus, it is important to be able to determine whether there is an adult 20 belted to the seat 12 or whether an infant seat 26 is secured to the seat with a seat belt 22. One way to determine this is by monitoring the tension exerted on the seat belt 22. When an adult 20 is belted to the seat, normal seat belt forces are exerted against the seat belt 22. When an infant or child seat 26 is belted to the seat 12, high tension forces are exerted on the seat belt 22 because the seat belt 22 is overtightened to securely hold the child seat 26 in place.

Figure 3:
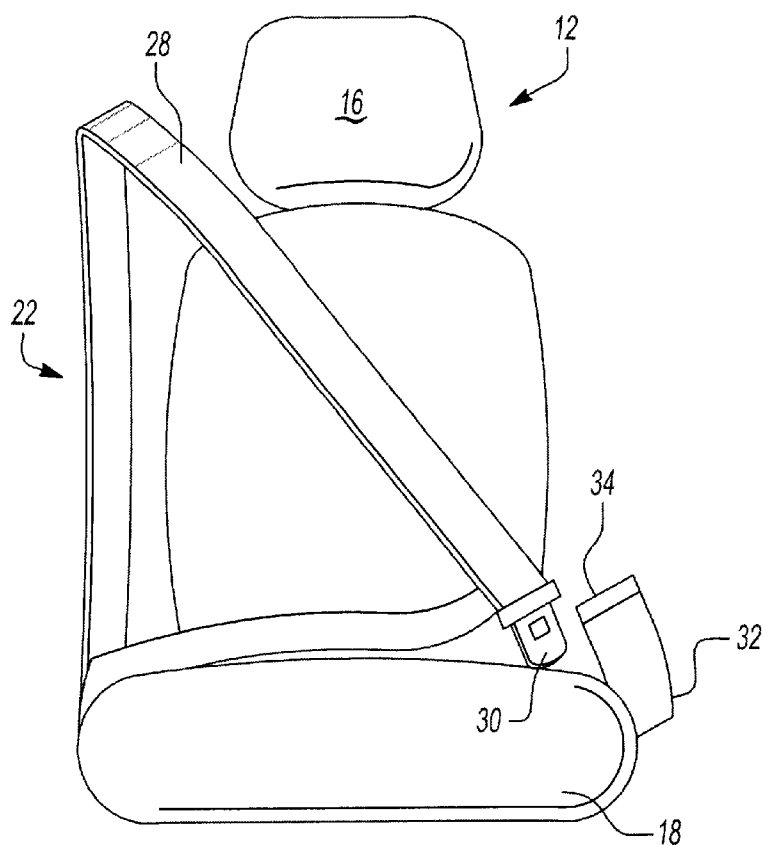
FIG. 3 is a schematic front view of a seat and seat belt assembly.

The seat belt 22, shown more clearly in FIG. 3, has a strap portion 28 that includes a shoulder harness and/or lap belt that is connected to a male buckle member 30. A seat belt latch mechanism 32 is hard mounted to the seat 12 and typically extends outwardly from the seat 12 between the seat back 16 and the seat bottom 18. The latch mechanism 32 includes a female receptacle 34 that receives the male buckle member 30 to secure the occupant 20 or child seat 26 to the seat 12. The strap portion 28 can be manually or automatically tightened once the belt is buckled to a desired tension.

Figure 4:
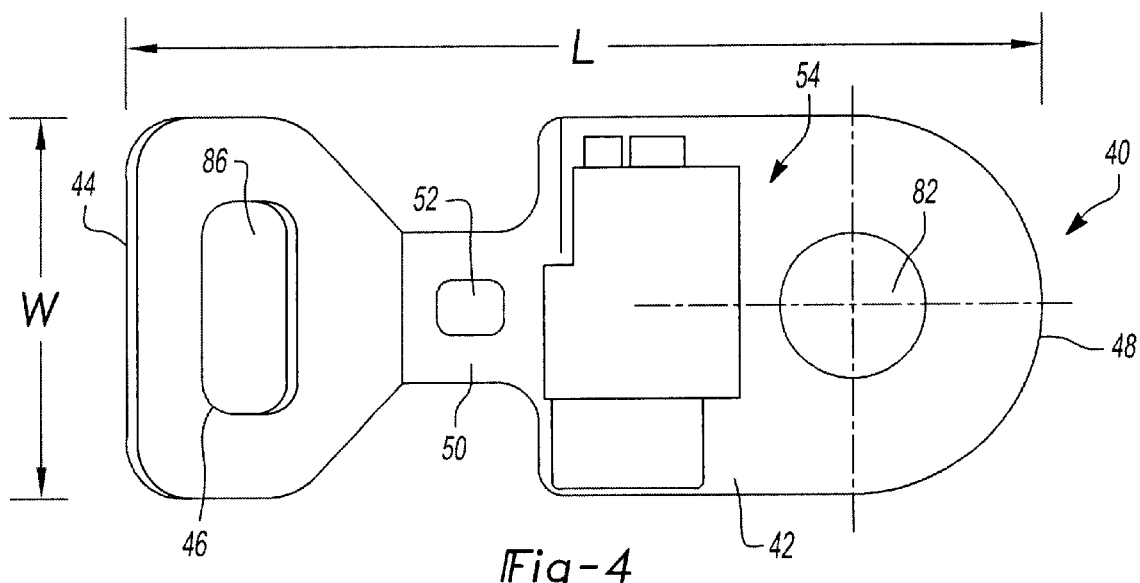
FIG. 4 is an overhead view of subject sensor assembly.
Figure 5:
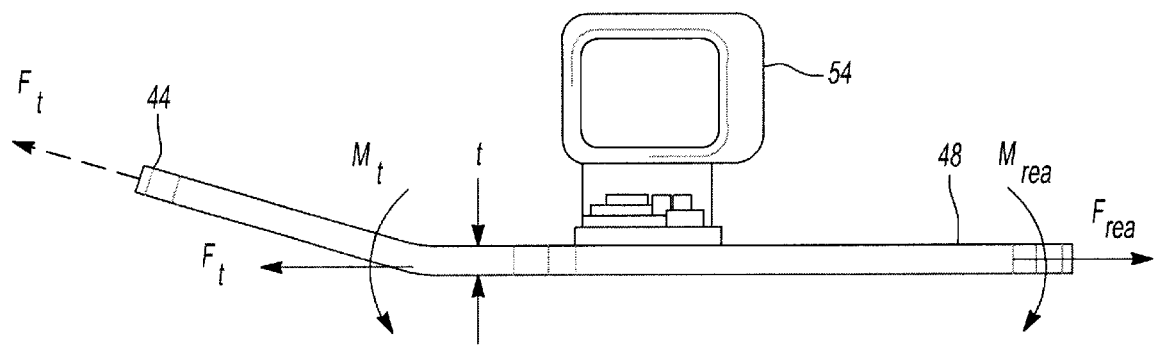
FIG. 5 is a side view of the sensor of FIG. 4.

A sensor assembly 40 for measuring the tension forces in the seat belt 22 is shown in FIGS. 4 and 5. The sensor assembly 40 includes a rigid member that is preferably formed as a metallic plate 42 from 4130Rc39 material, however, other similar materials could also be used. The plate 42 includes a first end 44 that is attached via a loop connection 46 to material that forms a portion of the seat belt 22 and a second end 48 that is attached to a vehicle structure. The vehicle structure attachment will be discussed in greater detail below.

The plate 42 is defined by a length "l", a width "w", and a thickness "t". In the preferred embodiment, the length l is greater than the width w and the thickness t is significantly less than the width w and the length l. The plate 42 includes a necked portion 50 positioned between the ends 44, 48 that is narrower than the ends 44, 48. A strain gage 52 is mounted on the necked portion 50. The tightening of the seat belt 22 exerts a tension force $F_T$ on the plate 42 via the looped connection 46, which results in strain on the necked portion 50. The strain gage 52 measures this strain. The strain gage 52 is preferably a full bridge strain gage with four (4) grids.

The first end 44 of the plate 42 is preferably positioned at an angle relative to the necked portion 50 and the second end 48. This causes the tension force to be applied at an angle, which creates a moment MT at one edge of the necked portion 50. The second end 48 of the plate 42 is hard mounted to a vehicle structure creating a reaction force $F_{rea}$ and moment $M_{rea}$. The strain gage 52 measures the strain resulting in the necked portion 50 of the plate 42 as the tension force $F_T$ is applied to the first end 44 of the plate 42.

Figure 6:
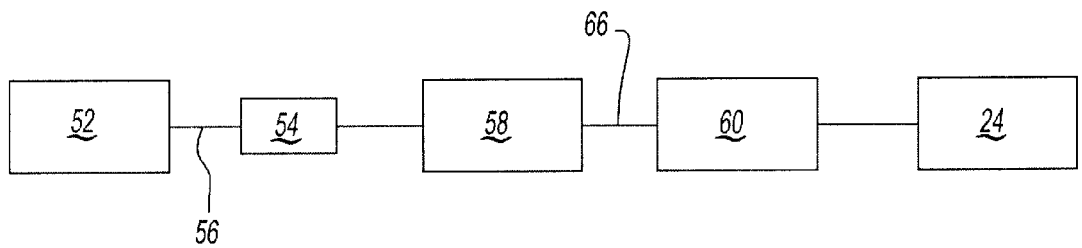
FIG. 6 is schematic diagram of the control system.
Figure 7:
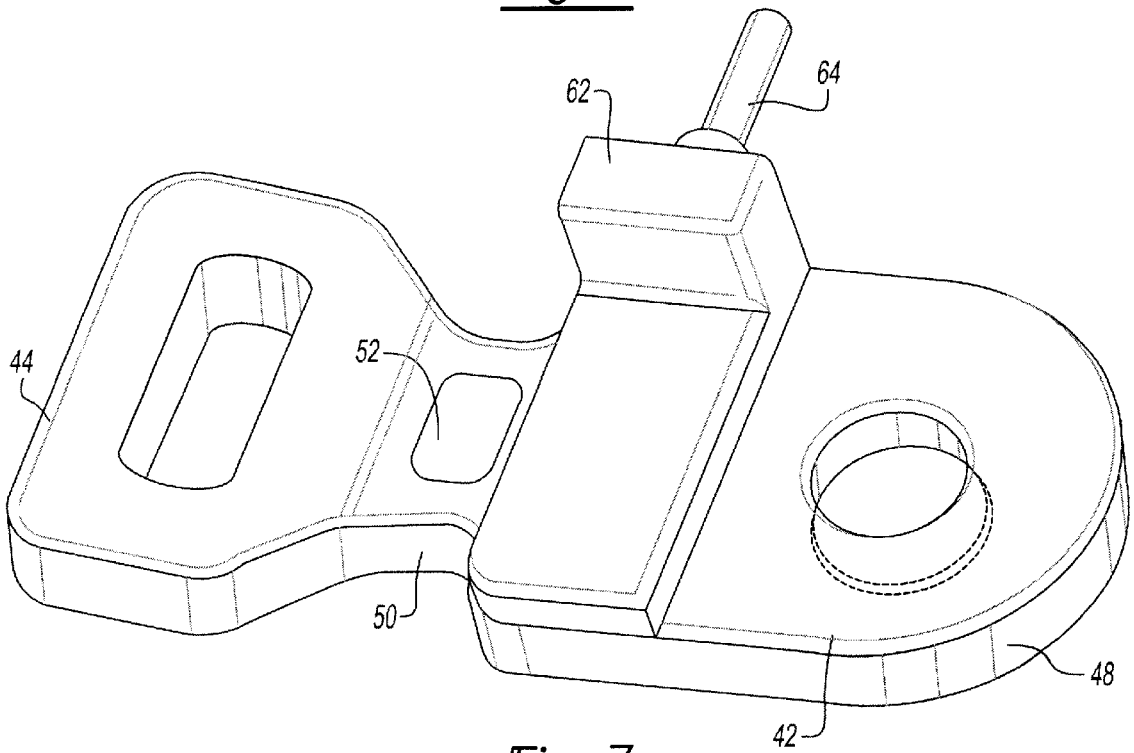
FIG. 7 is a perspective view of an alternate embodiment of the sensor assembly.

An electrical connector 54 is also mounted on the plate 42 adjacent to the strain gage 52. The strain measurements are generated as signals 56 that are sent from the gage 52 to the connector 54 and then to an electronic control unit (ECU) or microprocessor 58, see FIG. 6. The ECU 58 can be incorporated into the connector 54 to include the necessary electronics and printed circuit board (as shown in FIG. 4) or can be a separate component at a remote location on the vehicle. The ECU 58 processes the strain signals 56 to determine the magnitude of the tension forces $F_T$ exerted on the seat belt 22 and sends a control signal 66 to a central electronic control unit (ECU) or central microprocessor 60 to control deployment of the airbag 24. It should be understood that the ECU 58 and the central ECU 60 could be separate units or could be the same unit. An optional configuration for an electrical connector 62 is shown in FIG. 7. This configuration includes a simplified wire connection 64 to the ECU 58 and/or 60.

Figure 8:
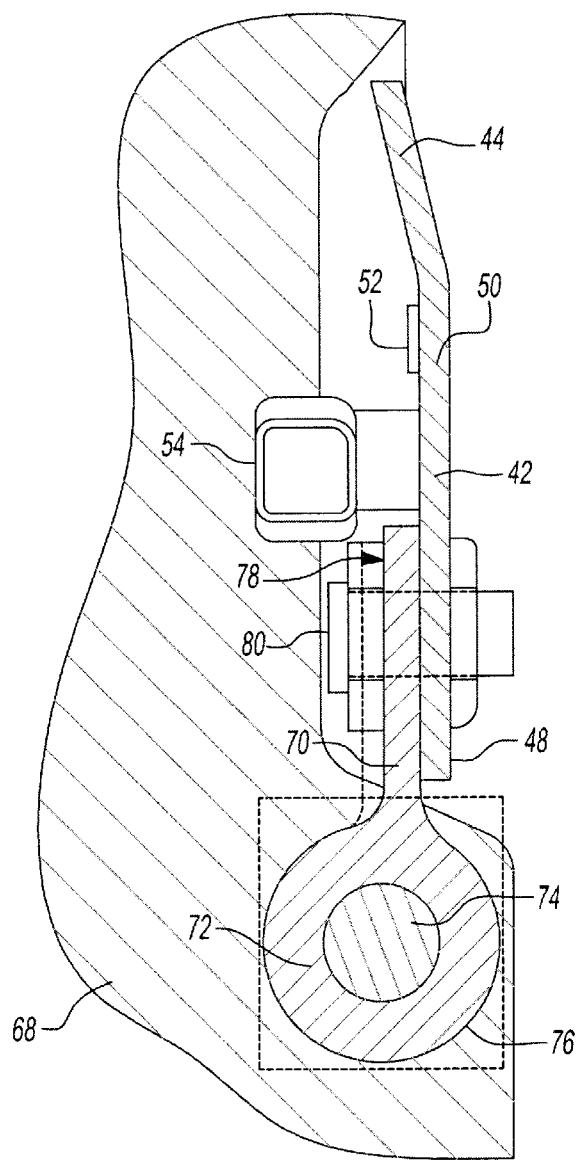
FIG. 8 is a side cross-sectional view of the sensor assembly mounted to a B-pillar.
Figure 9:
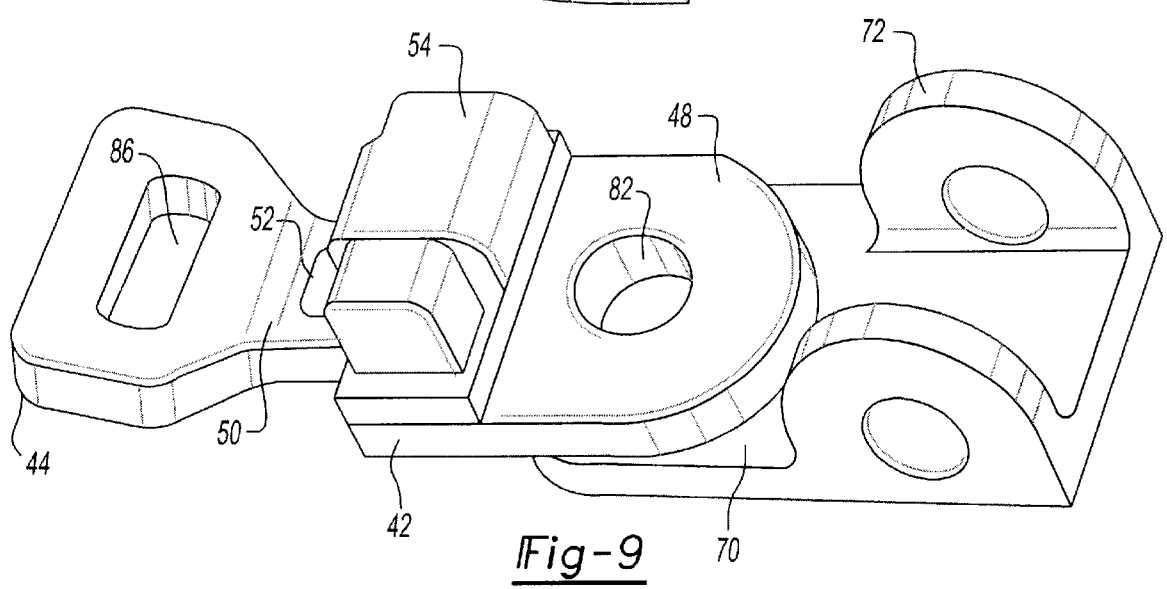
FIG. 9 is a perspective view of the sensor assembly of FIG. 8.
Figure 10:
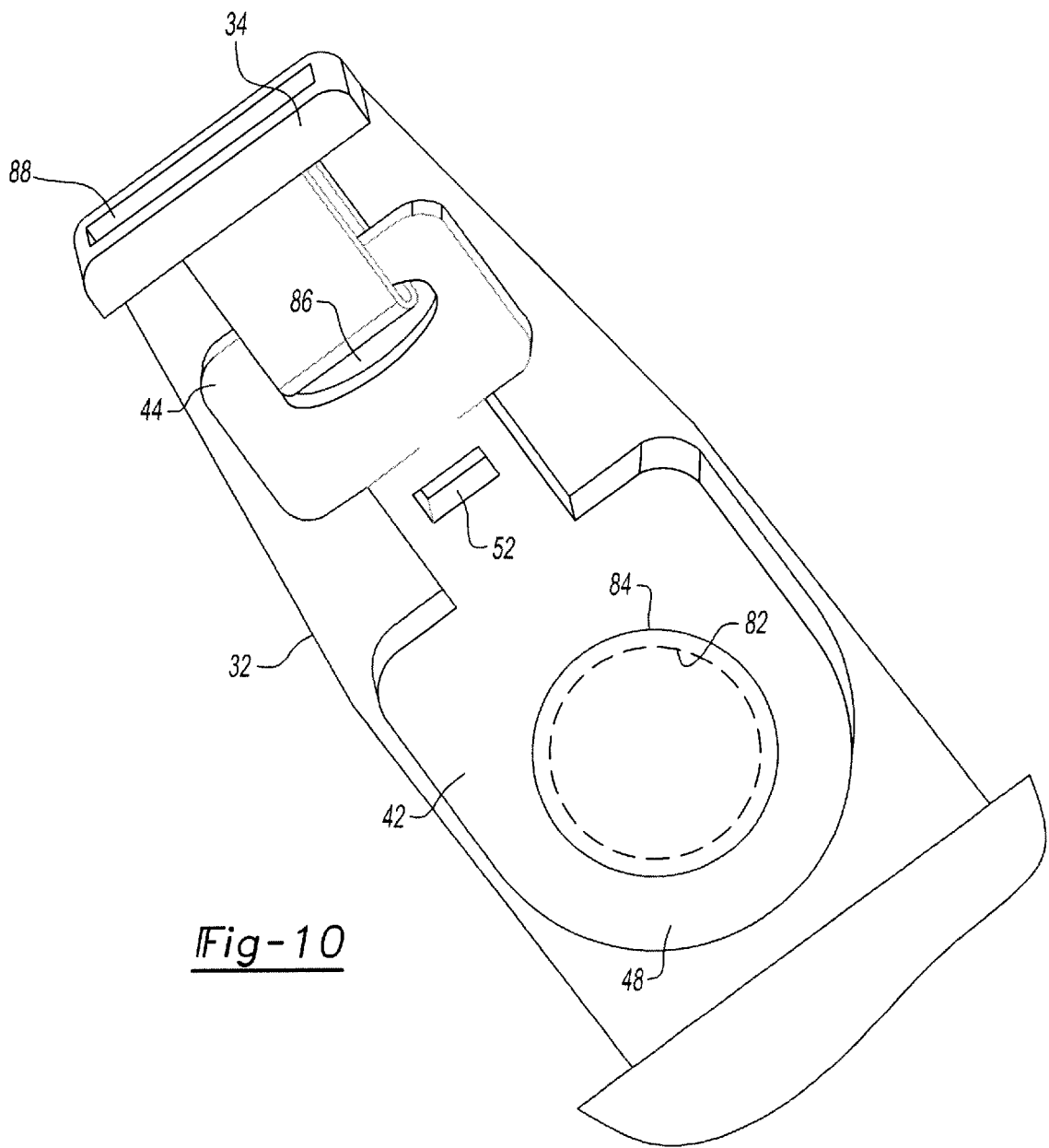
FIG. 10 is a perspective view, partially cut-away, of the sensor assembly mounted in a seat latch mechanism.

As discussed above, the plate 42 is hard mounted to a vehicle structure. The vehicle structure can be a B-pillar 68 as shown in FIGS. 8 and 9 or the seat latch mechanism 32 as shown in FIG. 10. The B-pillar 68 extends vertically to one side of the vehicle and is typically positioned adjacent to the seat 12 and behind a front passenger door of the vehicle. The B-pillar mount includes a secondary metal plate 70 that includes a circular boss 72 for receiving a pivot pin 74 at one end 76. The opposite end 78 of the secondary metal plate 70 is mounted to the rigid metal plate 42 with at least one fastener 80.

The seat latch mechanism mount is shown in FIG. 10. The second end 48 of the plate 42 includes at least one aperture 82 for receiving a fastener 84 to hard mount the plate 42 to the seat. The opposite end 44 of the plate 42 has an elongated slot 86 for connecting the plate 42 to the looped material, which extends to the female receptacle 34 having a slot 88 for receiving the buckle member 30.

In both configurations, the strain gage 52 measure the strain caused by the tension force $F_T$ in the seat belt 22. The airbag deployment is controlled based upon the strain measurements and the airbag 24 is not deployed if the tension force $F_T$ exceeds a predetermined limit. An adult can experience a tension force in a seat belt up to approximately 30 pounds (lbs) and still be comfortable. If the strain gage 52 measures a tension force $F_T$ that exceeds 30 lbs than that would indicate that a child seat 26 has been belted to the seat 12. Thus, the airbag 24 would not be deployed during a collision under these conditions. It should be understood that 30 lbs is an approximate value, which can vary due to differing seat and seatbelt configurations. Thus, the predetermined limit for comparison to the measured tension force $F_T$ can also vary depending upon the seat configuration.

The subject sensing system provides simplified and efficient apparatus and method for determining whether conditions are proper for deploying an airbag 24 by measuring seatbelt forces to discern whether a child in a child seat 26 or an adult is belted to the seat 12. The system provides accurate measurements and is easy to install.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A sensor assembly for measuring seatbelt forces comprising:
   a rigid member having a first end for supporting a seat belt portion and a second end for attachment to a vehicle structure wherein said rigid member defines a longitudinal axis;
   a strain gage mounted on said rigid member between said first and second ends for measuring the strain exerted on said rigid member by a tension force applied to the seat belt portion; and
   an electrical connector mounted to said rigid member adjacent to said strain gage and including a connection extending transversely to said longitudinal axis for connection to a control unit wherein said electrical connector receives strain measurements from said strain gage and transmits said measurements to a central processor to determine the magnitude of the tension force.

2. An assembly according to claim 1 wherein said rigid member is a metallic plate defined by a length, width, and thickness with said length being greater than said width and said thickness being significantly less than said length and said width.

3. An assembly according to claim 1 wherein said rigid member includes a neck portion positioned between said first and second ends having a width that is less than the width of said first and second ends and wherein said strain gage is mounted on said neck portion.

4. An assembly according to claim 3 wherein said first end includes an elongated slot for a loop attachment to the seat belt portion and said second end includes at least one aperture for receiving a fastener for attachment to the vehicle structure.

5. An assembly according to claim 4 wherein said electrical connector is mounted to said rigid member adjacent to said second end between said aperture and said neck portion.

6. A system according to claim 1 wherein said rigid member is defined by a length and a width with said electrical connector being mounted to said rigid member substantially across said width.

7. A system according to claim 6 wherein said electrical connector includes a main body portion for supporting at least one electrical component, said main body portion being directly mounted to said rigid member.

8. A system according to claim 7 wherein said electrical component comprises a control unit.

9. A system according to claim 7 wherein said electrical component comprises a printed circuit board.

10. A sensor system for controlling airbag deployment comprising:
    a seat belt for securing an occupant to a vehicle seat;
    a rigid plate having a first end for supporting a portion of said seat belt and a second end for attachment to a vehicle structure wherein said rigid plate defines a longitudinal axis;
    a strain gage mounted on said rigid plate between said first and second ends for measuring the strain exerted on said rigid plate by a tension force applied to said seat belt;
    an electrical connector mounted to said rigid plate adjacent to said strain gage and including a connection extending transversely to said longitudinal axis for connection to a control unit wherein said electrical connector receives strain measurements from said strain gage and transmits said measurements to a processor to determine the magnitude of the tension force wherein said processor generates a force signal representative of the magnitude of said forces; and
    an airbag mounted adjacent to the vehicle seat wherein airbag deployment is controlled based on said force signal.

11. A system according to claim 10 wherein said airbag does not deploy when said force signal exceeds a predetermined limit.

12. A system according to claim 11 wherein said rigid plate includes a neck portion positioned between said first and second ends, said neck portion having a width that is less than a width of said first and second ends and wherein said strain gage is mounted on said neck portion.

13. A system according to claim 12 wherein said vehicle structure is a B-pillar extending vertically adjacent to one side of said seat.

14. A system according to claim 12 wherein said vehicle structure is a seat mount for a seat belt buckle latch mechanism.

15. A system according to claim 14 wherein said seat belt includes a buckle strap for supporting a male buckle member and said seat belt buckle latch mechanism includes a female receptacle for receiving said male buckle member to securely latch the occupant to said seat with said portion of said seat belt extending between said male receptacle and said rigid plate.

16. A system according to claim 10 wherein said electrical connector includes a main body portion for supporting at least one electrical component and is directly mounted to said rigid plate between said strain gage and said second end.

17. A sensor system for controlling airbag deployment comprising:
    a seat belt for securing an occupant to a vehicle seat;
    a rigid plate having a first end for supporting a portion of said seat belt, a second end for attachment to a vehicle structure comprising a B-pillar extending vertically adjacent to one side of said seat, and a neck portion positioned between said first and second ends, said neck portion having a width that is less than a width of said first and second ends;
    a secondary plate having a first end pivotally mounted to said B-pillar and a second end rigidly attached to said second end of said rigid member;
    a strain gage mounted on said neck portion of said rigid plate between said first and second ends for measuring the strain exerted on said rigid plate by a tension force applied to said seat belt;

an electrical connector mounted to said rigid plate adjacent to said strain gage for receiving strain measurements from said strain gage and transmitting said measurements to a processor to determine the magnitude of the tension force wherein said processor generates a force signal representative of the magnitude of said forces; and an airbag mounted adjacent to the vehicle seat wherein airbag deployment is controlled based on said force signal and said airbag does not deploy when said force signal exceeds a predetermined limit.

18. A system according to claim 17 wherein said first end of said rigid plate includes an elongated slot for a loop attachment to said portion of said seat belt and said second end of said rigid plate includes at least one aperture aligned with a corresponding aperture in said second end of said secondary plate for receiving a fastener for attachment to attach said rigid plate to said secondary plate.

19. A system according to claim 18 wherein said first end of said secondary plate includes a circular boss for receiving a pivot pin.

20. A method for measuring seatbelt forces for controlling airbag deployment comprising the steps of:

providing a sensor assembly including a rigid plate having a first end secured to a seatbelt portion, a second end secured to a vehicle structure, and a narrow neck portion interconnecting the first and second ends wherein the rigid plate defines a longitudinal axis extending along a length of the rigid plate;

mounting a strain gage directly to the rigid plate on the narrow neck portion;

mounting an electrical connector directly to the rigid plate between the strain gage and the second end wherein the electrical connector includes a connection extending transversely to the longitudinal axis; and measuring strain on the rigid plate due to seatbelt tension force with the strain gage.

21. A method according to claim 20 including the step of mounting a printed circuit board to the electrical connector.

22. A method according to claim 20 including the step of mounting an electronic control unit to the electrical connector.

* * * * *